(12) United States Patent
Balasubramaniam et al.

(10) Patent No.: US 7,765,202 B2
(45) Date of Patent: Jul. 27, 2010

(54) SYSTEM CONTROLLER DATABASE MANAGER WITH QUERY STACKING AND CACHING FOR ELECTRICAL DISTRIBUTION SYSTEM

(75) Inventors: Ravikumar Balasubramaniam, Alpharetta, GA (US); Seshagiri R Marellapudi, Norcross, GA (US); David M Williams, Alpharetta, GA (US); Paul Terricciano, Roswell, GA (US)

(73) Assignee: Siemens ndustry, Inc., Alpharetta, GA (US)

( * ) Notice: Subject to any disclaimer, the term of this patent is extended or adjusted under 35 U.S.C. 154(b) by 270 days.

(21) Appl. No.: 11/635,449

(22) Filed: Dec. 7, 2006

(65) Prior Publication Data

US 2008/0126315 A1    May 29, 2008

Related U.S. Application Data

(60) Provisional application No. 60/826,577, filed on Sep. 22, 2006.

(51) Int. Cl.
*G06F 7/00* (2006.01)

(52) U.S. Cl. .................. 707/713; 707/758; 707/770; 707/782

(58) Field of Classification Search ............ 707/1, 707/2, 3, 4, 5, 10, 713, 758, 770, 782; 711/118; 709/229; 705/1.1
See application file for complete search history.

(56) References Cited

U.S. PATENT DOCUMENTS

| | | | |
|---|---|---|---|
| 5,961,602 A * | 10/1999 | Thompson et al. | 709/229 |
| 7,047,242 B1 * | 5/2006 | Ponte | 707/10 |
| 7,130,964 B2 * | 10/2006 | Ims et al. | 711/118 |
| 7,177,818 B2 * | 2/2007 | Nair | 705/1.1 |
| 7,395,258 B2 * | 7/2008 | Altinel et al. | 707/3 |
| 2002/0107835 A1 * | 8/2002 | Coram et al. | 707/1 |
| 2004/0059719 A1 * | 3/2004 | Gupta et al. | 707/3 |
| 2006/0100973 A1 * | 5/2006 | McMaster et al. | 707/1 |
| 2007/0233638 A1 * | 10/2007 | Carroll et al. | 707/2 |
| 2008/0077557 A1 * | 3/2008 | Schneider et al. | 707/2 |
| 2008/0091667 A1 * | 4/2008 | Nair | 707/4 |
| 2008/0215580 A1 * | 9/2008 | Altinel et al. | 707/5 |

OTHER PUBLICATIONS

Jaeyeon Jung et al., "DNS Performance and the Effectiveness of Caching", ACM, 2002, pp. 589-603.*

* cited by examiner

*Primary Examiner*—Thuy N Pardo
(74) *Attorney, Agent, or Firm*—Jose de la Rosa (57) ABSTRACT

An electrical distribution system includes a database manager using a query stack, comprising a panel with a plurality of remote operated devices mounted in the panel. Each remote operated device is for connection in a branch circuit to a load device. A panel controller is operatively connected to each of the remote operated devices. The panel controller comprises a programmed controller for controlling operation of the remote operated devices. A database is operatively associated with the programmed controller storing configuration data relating to operation of the remote operated devices. The panel controller is programmed to implement a database manager for accessing data in the database responsive to requests of the programmed controller, comprising storing a cache of data queries and responsive to a received request for data determining if a query relating to the received request is stored in the cache and returning the stored query, and operating the returned query to access data in the database.

15 Claims, 8 Drawing Sheets

SYSTEM CONTROLLER DATABASE MANAGER WITH QUERY STACKING AND CACHING FOR ELECTRICAL DISTRIBUTION SYSTEM

CROSS REFERENCE TO RELATED APPLICATIONS

This application claims priority of provisional application No. 60/826,577 filed Sep. 22, 2006, the contents of which is incorporated by reference herein.

FIELD OF THE INVENTION

This invention relates generally to residential and commercial electrical power distribution panels and components, and more particularly, to a system controller including a database manager providing a database abstraction layer with query stack and caching in an electrical power distribution system.

BACKGROUND OF THE INVENTION

Circuit breaker panels are used to protect electrical circuitry from damage due to an overcurrent condition, such as an overload, a relatively high level short circuit, or a ground fault condition. To perform that function, circuit breaker panels include circuit breakers that typically contain a switch unit and a trip unit. The switch unit is coupled to the electrical circuitry (i.e., lines and loads) such that it can open or close the electrical path of the electrical circuitry. The switch unit includes a pair of separable contacts per phase, a pivoting contact arm per phase, an operating mechanism, and an operating handle.

In the overcurrent condition, all the pairs of separable contacts are disengaged or tripped, opening the electrical circuitry. When the overcurrent condition is no longer present, the circuit breaker can be reset such that all the pairs of separable contacts are engaged, closing the electrical circuitry.

In addition to manual overcurrent protection via the operating handle, automatic overcurrent protection is also provided via the trip unit. The trip unit, coupled to the switch unit, senses the electrical circuitry for the overcurrent condition and automatically trips the circuit breaker. When the overcurrent condition is sensed, a tripping mechanism included in the trip unit actuates the operating mechanism, thereby disengaging the first contact from the second contact for each phase. Typically, the operating handle is coupled to the operating mechanism such that when the tripping mechanism actuates the operating mechanism to separate the contacts, the operating handle also moves to a tripped position.

Switchgear and switchboard are general terms used to refer to electrical equipment including metal enclosures that house switching and interrupting devices such as fuses, circuit breakers and relays, along with associated control, instrumentation and metering devices. The enclosures also typically include devices such as bus bars, inner connections and supporting structures (referred to generally herein as "panels") used for the distribution of electrical power. Such electrical equipment can be maintained in a building such as a factory or commercial establishment, or it can be maintained outside of such facilities and exposed to environmental weather conditions. Typically, hinge doors or covers are provided on the front of the switchgear or switchboard sections for access to the devices contained therein.

In addition to electrical distribution and the protection of circuitry from overcurrent conditions, components have been added to panels for the control of electrical power to loads connected to circuit breakers. For example, components have been used to control electrical power for lighting.

One system used for controlling electrical power to loads utilizes a remote-operated circuit breaker system. In such a system, the switch unit of the circuit breaker operates not only in response to an overcurrent condition, but also in response to a signal received from a control unit separate from the circuit breaker. The circuit breaker is specially constructed for use as a remote-operated circuit breaker, and contains a motor for actuating the switch unit.

In an exemplary remote-operated circuit breaker system, a control unit is installed on the panel and is hard-wired to the remote-operated circuit breaker through a control bus. When the switch unit of the circuit breaker is to be closed or opened, an operating current is applied to or removed from the circuit breaker motor directly by the control panel. Additional, separate conductors are provided in the bus for feedback information such as contact confirmation, etc., for each circuit breaker position in the panel. The control unit contains electronics for separately applying and removing the operating current to the circuit breakers installed in particular circuit breaker positions in the panel. The panel control unit also has electronics for checking the state of the circuit breaker, diagnostics, etc. One advantage of that system is that the individual circuit breakers can be addressed according to their positions in the panel.

Known control units may include a user interface enabling a user to configure system operation, such as setting up panels, breakers, schedules and the like. The set up process can be time consuming and repetitive. This repetitiveness can consume system resources which further slows down the configuration process.

The present invention is directed to improvements in electrical distribution systems, such as lighting control panels

SUMMARY OF THE INVENTION

In accordance with the invention, there is provided an electrical distribution system including an integrated system controller including a database manager providing a database abstraction layer with query stack and caching.

There is disclosed in accordance with one aspect of the invention a method of requesting access to data in an electrical distribution system, comprising: providing a panel comprising a plurality of remote operated devices mounted in the panel, each remote operated device for connection in a branch circuit to a load device, and a panel controller operatively connected to each of the remote operated devices, the panel controller comprising a programmed controller for controlling operation of the remote operated devices; providing a database associated with the programmed controller storing configuration data relating to operation of the remote operated devices; and operating a database manager for accessing data in the database responsive to requests of the programmed controller, comprising storing a cache of data queries and responsive to a received request for data determining if a query relating to the received request is stored in the cache and returning the stored query, and operating the returned query to access data in the database.

It is a feature of the invention that the database manager further comprises retrieving a query from a resource if the query relating to the received request is not stored in the cache and then storing the retrieved query in the cache.

It is another feature of the invention to return the retrieved query, and operate the returned query to access data in the database.

It is a further feature of the invention to remove a least accessed query form the cache.

It is still another feature of the invention that operating the database manager further comprises providing a single resource to access data in the database and wherein operating the returned query to access data in the database comprises establishing a connection with the single resource.

It is yet another feature of the invention that the single resource allows only a single database connection at a time.

There is disclosed in accordance with another aspect of the invention a method of requesting access to data in an electrical distribution system including a panel comprising a plurality of remote operated devices mounted in the panel, each remote operated device for connection in a branch circuit to a load device, and a panel controller operatively connected to each of the remote operated devices, the panel controller comprising a programmed controller for controlling operation of the remote operated devices, the method comprising: providing a database associated with the programmed controller storing configuration data relating to operation of the remote operated devices; providing a cache of database queries; receiving a request for accessing data in the database; determining if a query relating to the received request is stored in the cache and returning the stored query; and operating the returned query to access data in the database.

There is disclosed in accordance with a further aspect of the invention an electrical distribution system including a database manager using a query stack, comprising a panel with a plurality of remote operated devices mounted in the panel. Each remote operated device is for connection in a branch circuit to a load device. A panel controller is operatively connected to each of the remote operated devices. The panel controller comprises a programmed controller for controlling operation of the remote operated devices. A database is operatively associated with the programmed controller storing configuration data relating to operation of the remote operated devices. The panel controller is programmed to implement a database manager for accessing data in the database responsive to requests of the programmed controller, comprising storing a cache of data queries and responsive to a received request for data determining if a query relating to the received request is stored in the cache and returning the stored query, and operating the returned query to access data in the database.

Further features and advantages of the invention will be readily apparent from the specification and from the drawings.

DETAILED DESCRIPTION OF THE INVENTION

An electrical distribution system, such as an integrated lighting control system, in accordance with the invention permits a user to control power circuits typically used for lighting, as well as circuits for resistive heating or air conditioning, including an integrated system controller having a database manager providing a database abstraction layer with query stack and caching. Control may include on/off switching, dimming and metering. The electrical distribution system may be as is generally described in U.S. application Ser. No. 11/519,727, filed Sep. 12, 2006, the specification of which is incorporated by reference herein.

Figure 1:
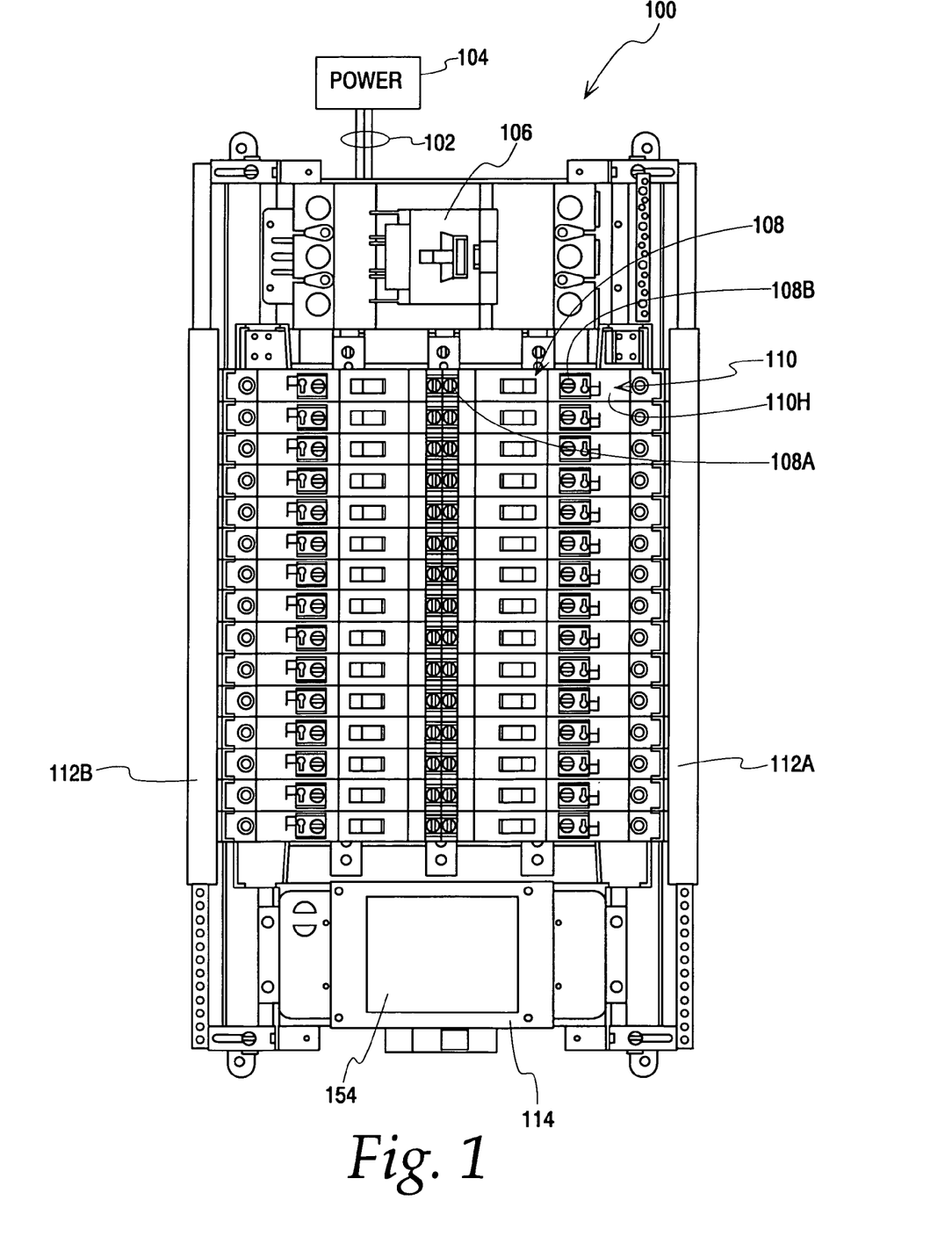
FIG. 1 is an elevation view of a power distribution panel according to the invention.

Referring to FIG. 1, a lighting control system in accordance with the invention comprises a lighting control panel 100. The panel 100 may comprise a Siemens type P1 panelboard, although the invention is not limited to such a configuration. Line power enters the panel 100 through power source cables 102 connected to a source of power 104. Line power may, for example, be a three phase 480Y277, 240 or 120 VAC power source, as is conventional. The cables 102 are electrically connected to an input side of a main breaker 106. The main breaker 106 distributes line power to individual circuit breakers 108 in a conventional manner. How the power is distributed depends on design of the individual circuit breakers 108, as will be apparent to those skilled in the art. The power is distributed to the line side of individual circuit breakers 108. The panel 100 may be configured to accept up to forty-two individual circuit breakers 108, although only thirty are shown in the embodiment of FIG. 1. Each circuit breaker may be of conventional construction and may be, for example, a Siemens BQD circuit breaker. Each circuit breaker 108 includes a line terminal 108A receiving power from the main breaker 106 and a load terminal 108B conventionally used for connecting to a load circuit.

For simplicity of description, when a device such as a circuit breaker 108 is described generally herein the device is referenced without any hyphenated suffix. Conversely, if a specific one of the devices is described it is referenced with a hyphenated suffix, such as 108-1.

In accordance with the invention, each load circuit to be controlled also has a remote operated device 110, such as a relay, a meter or a dimmer. The term remote operated device as used herein includes any other devices that controls, monitors or may otherwise be used in a load circuit, in accordance with the invention. While in a preferred embodiment, the remote operated device 110 is a separate component from the circuit breaker 108, the term "remote operated device" as used herein encompasses devices integral with the circuit breaker. The remote operated devices 110 are also connected to data rails 112A and 112B. A panel controller 114 controls the remote operated devices 110 through connections provided via the data rails 112A and 112B, as discussed below.

The remote operated device 110 includes a housing 110H encasing an auxiliary set of contacts that can be remotely operated to open and close a lighting circuit. The device 110 is attached to the load side of a circuit breaker 108 within a panel 100 using a conductor tab, i.e, the terminal 110A, inserted into the breaker lug 108B. The load terminal 110B comprises a lug of the same size as the breaker lug 108B for connecting to a wire to be connected to the load device. The device housing 110H is configured to mount in a Siemens type P1 panelboard, although the invention is not limited to such a configuration.

Figure 2:
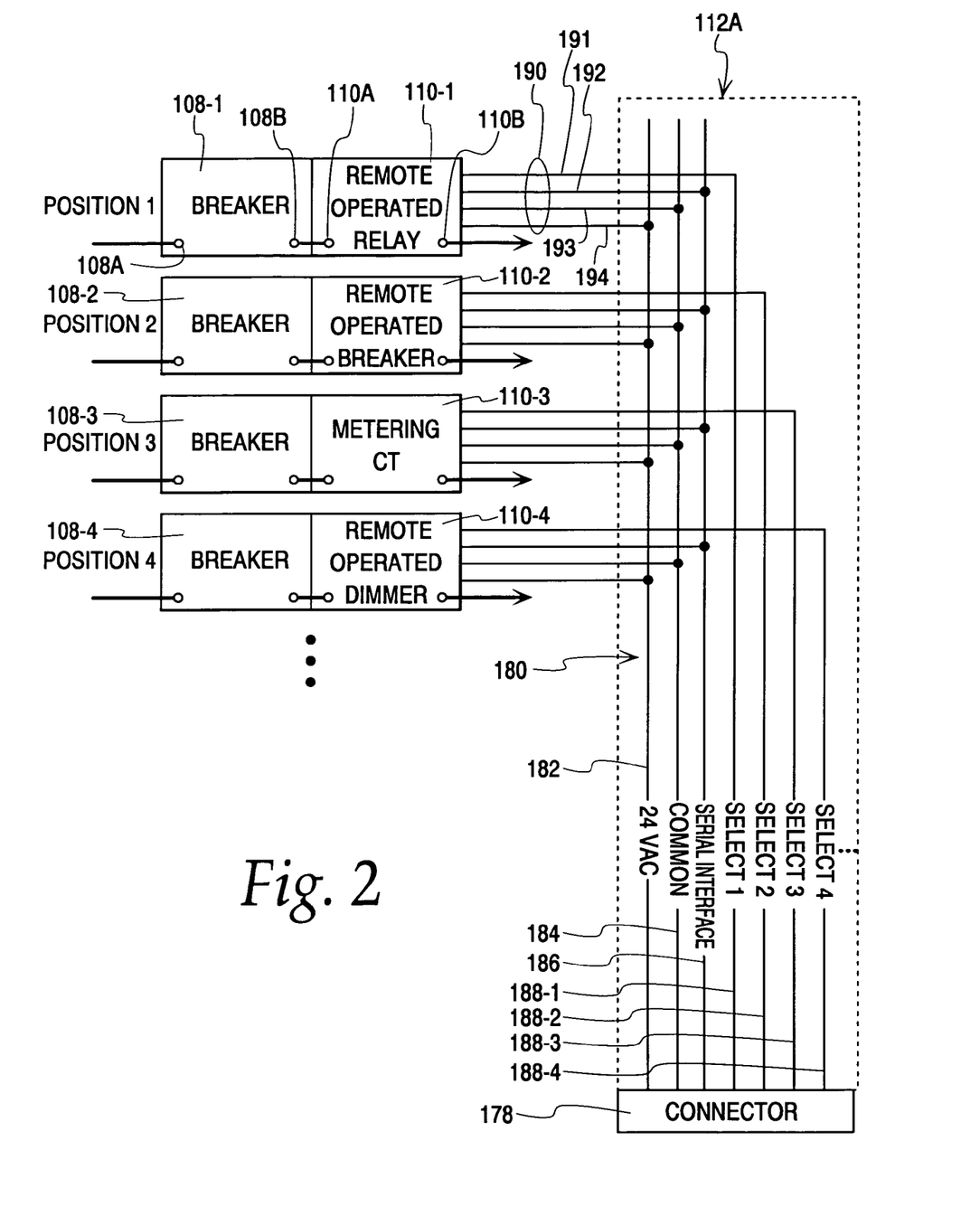
FIG. 2 is a block diagram illustrating pairs of circuit breakers and remote operated devices of the power distribution panel of FIG. 1.

Referring to FIG. 2, a block diagram illustrates four circuit breakers 108-1, 108-2, 108-3 and 108-4, and respective associated remote operated devices 110-1, 110-2, 110-3 and 110-4. In the illustrated embodiment, the first device 110-1 comprises a relay, the second device 110-2 comprises a breaker, the third device 110-3 comprises a current transformer, and the fourth device 110-4 comprises a dimmer. As is apparent, any combination of these remote operated devices 110 could be used. Each remote operated device 110 includes an input terminal 110A electrically connected to the associated circuit breaker load terminal 108B, and an output terminal 110B for connection to a load device.

Figure 3:
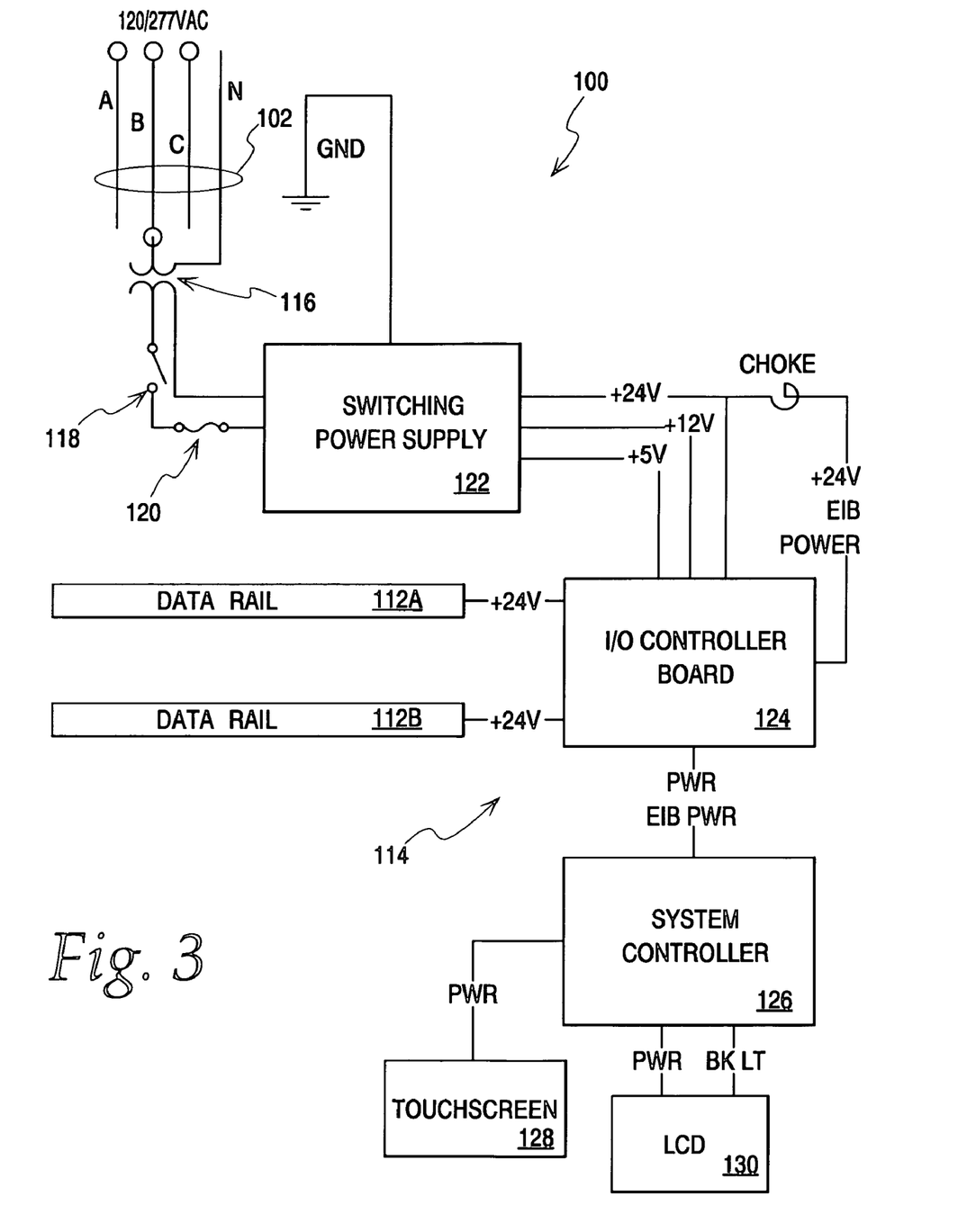
FIG. 3 is a block diagram of the power distribution panel of FIG. 1.

Referring to FIG. 3, a block diagram of the lighting control panel 100 is illustrated. Power from the lines 102 is provided via an isolation transformer 116, power switch 118 and fuse 120 to a switching power supply 122. The panel controller 114 comprises an input/output (I/O) controller 124 and optionally a system controller 126. The power supply 122 provides isolated power to all of the control components including the I/O controller board 124, the system controller 126, and the remote operated devices 110, see FIG. 1, via the data rails 112A and 112B. The I/O controller 124 and system controller 126 each have DC-DC converters deriving regulated DC voltage levels as required from the main DC output of the power supply 122. The power supply 122 also provides 24 volts to the remote operated devices 110. The system controller 126 is operatively connected to a touch screen 128 and an LCD 130.

Figure 4:
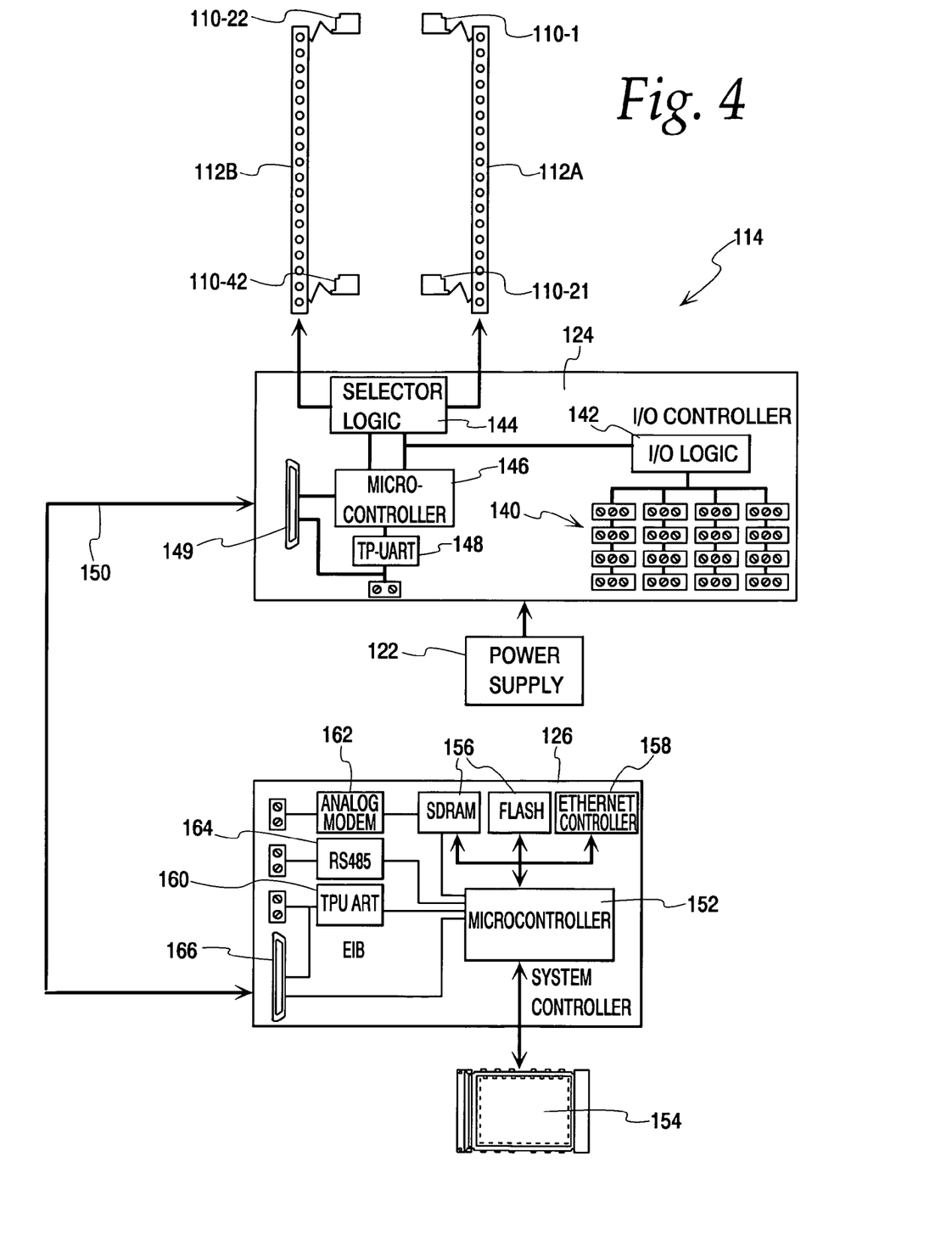
FIG. 4 is an expanded schematic/block diagram of the power distribution panel of FIG. 1.

In one embodiment of the invention, shown in FIG. 4, the panel controller 114 functions as a single panel stand alone system. The I/O controller 124 supplies power and control signals through the rails 112A and 112B to the remote operated devices, four of which, 110-1, 110-21, 110-22 and 110-42, are illustrated. A user interface and high level scheduling and control are provided by the system controller 126.

The I/O controller 124 provides discrete inputs to the panel controller 114 from dry contact switches, such as wall switches, (not shown) which can be connected to discrete input terminals 140. The terminals 140 are organized as two inputs and a common. The inputs to the terminals 140 are detected by dry contact I/O logic 142. A selector logic block 144 generates selector line signals and serial communications to the remote operated devices 110 via the data rails 112. The logic blocks 142 and 144 are operatively associated with a microprocessor or microcontroller 146. A TP-UART integrated circuit 148 provides an EIB (European Installation Bus) interface. A connector 149 allows mating directly to the system controller 126 via a cable 150.

The system controller 126 provides the user with an application to implement lighting schedules, organize devices into logical groups, manage the inputs, and obtain status information. The system controller 126 includes a microprocessor 152 operatively connected to a touch panel user interface 154 in the form of an integrated touch screen 128 and LCD 130, see FIG. 3. The microprocessor 152 is also connected to memory devices 156 and an ethernet controller 158. A TP-UART circuit 160 provides an EIB interface while additional interfaces are provided via an analog modem 162 and RS 485 interface circuit 164. A connector 162 is provided for connection to the cable 150.

The system controller 126 provides a User Interface application via the touch panel user interface 154 for the user to configure the system. This configuration includes setting up panels, breakers, zones, inputs, I/O mappings, schedules and overrides. This information is stored in an SQL CE (also called as SQL Mobile) database in the system controller memory 400M, including the memory 156 of FIG. 4. A Database Abstraction Layer, called DB Manager, in accordance with the invention is designed as a central object that talks to the database, whereas the rest of the objects in the system talk to the DB Manager. This provides a clean interface architecturally and also overcomes the limitations of the SQL Mobile in smart device applications due to the size limits, without compromising on performance.

Referring again to FIG. 2, a data rail 112 is illustrated schematically. The data rail 112 is mechanically attached directly to the interior of the lighting control panel 100. The data rail 112 comprises a shielded communication bus including a ribbon connector 178 having twenty-five to twenty-nine wires to be routed to the I/O controller board 124. The ribbon connector 178 typically has twenty-six wires, two for power connection, two for ground connection, one for the serial line and up to twenty-one select lines, one for each remote operated device 110. Each data rail 112 provides a barrier to isolate the class 1 load wires from the class 2 signal wires used to manage the devices 110. The data rails 112 will connect to each device 110 via a connector that extends out of the device 110. The wires are connected to a printed circuit board 180 included traces defined as follows. A power trace 182 provides 24 volt DC power to each remote operated device 110. A common trace 184 provides a ground to each remote operated device 110. A serial interface trace 186 provides serial communication to each of the remote operated devices 110. A plurality of select line traces, four of which 188-1, 188-2, 188-3 and 188-4 are illustrated, are provided, one for each remote operated device 110. Each remote operated device 110 includes a four wire cable 190 for connection to the data rail 112. The four wires comprise a select line 191 connected to one of the select traces 188, a serial interface line 192 connected to the serial interface trace 186, a neutral wire 193 connected to the common trace 184 and a power wire 194 connected to the power trace 182.

In accordance with the invention, a unique select line is assigned to each breaker 108/remote operated device 110 pair positioned within the lighting control panel 100. Select lines are used by the I/O controller 124 to select single remote operated devices to communicate via the serial interface trace 186. For example, when the first select line 188-1 is asserted, the first remote operated device 110-1 listens for messages on the serial interface line 186. Conversely, messages on the serial interface 186 are ignored if the first select line 188-1 is not asserted. A response by any of the remote operated devices 110 to a serial command is therefore conditional on whether its particular select line is asserted. The term "asserted", as used herein, means one state of a signal designated to cause the remote operated device to listen for messages. In a preferred embodiment, the select line has "high" and "low" states, the high state being the asserted state.

The remote operated device 110, in the form of a relay, allows remote switching of an electrical branch load. The device 110 is designed to fit inside a standard electrical panel board with up to forty-two branch circuit breakers 108. The device 110 is an accessory to a branch circuit breaker 108 allowing repetitive switching of the load without effecting operation of the circuit breaker 108.

Figure 5:
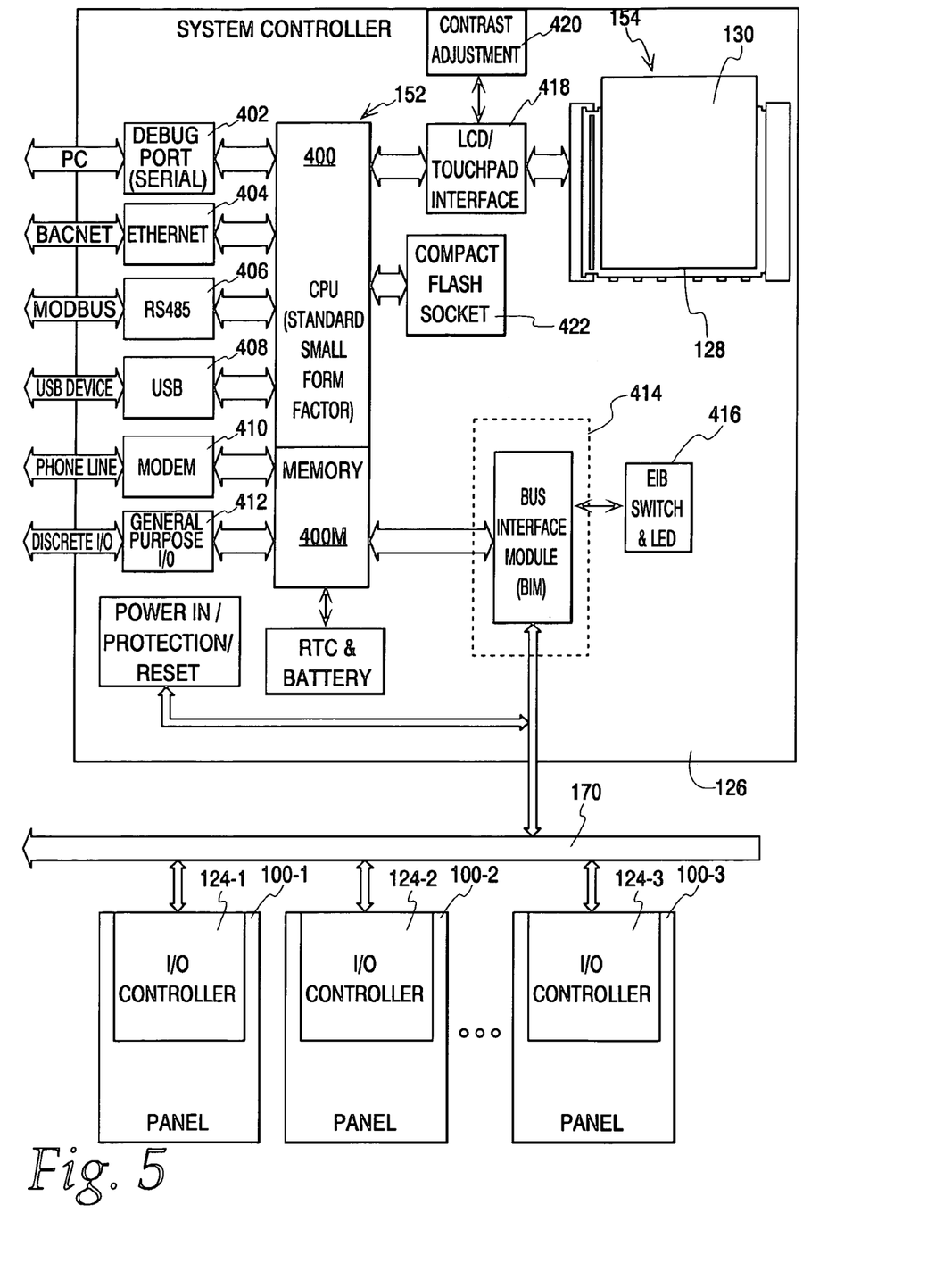
FIG. 5 is a detailed block diagram of the system controller of FIG. 4.

FIG. 5 illustrates a block diagram of the system controller 126 in a multiple panel system. The system controller 126 is controlled by the microcontroller 152 in the form of a standard form factor embedded CPU module 400 including appropriate memory circuits 400M, as is conventional. Various means for communication are provided with the system controller 126. A debug port 402 is a serial communication link similar to RS 232 used to load and debug the CPU 400. An ethernet controller 404 is capable of interfacing with Bacnet or the internet. An RS485 port 406 can be used with Modbus protocol. A USB interface 408 is provided for interfacing to a memory stick or other USB devices. A modem 410 provides for phone line communications. A general purpose I/O interface 412 is provided for special discrete I/O functions. Additionally, the CPU module 400 has a serial interface to a bus interface module (BIM) 414 used to connect to the EIB bus 170. As described, the EIB bus 170 is used as a connection means between the system controller 126 and each of the I/O controllers, such as 124A, 124B and 124C. Alternatively, with the master I/O controller, such as described above relative to FIG. 5, the system controller 126 is directly connected to the master I/O controller 124-1 and connections between I/O controllers is via the EIB bus 170. In order to configure an EIB device, an EIB switch and LED 416 are used to locate and address the device. The protocol on this bus conforms to the Konnex standard.

The CPU module 400 also includes an LCD/touch pad interface 418 for driving the user interface 154 comprising the touchscreen 128 and LCD 130, see FIG. 3. This interface 418 allows a user to interact with the system controller 126. The LCD 130 is a 5.1" diagonal monochrome graphical device. Alternatively, a color display could be used. The display 130 includes an LED back light. A contrast adjustment circuit 420 is connected to the interface 418 and may consist of a potentiometer, or the like. The touchscreen 128 is a standard four wire type device. The combination of an LCD 130 and touchscreen 128 provides improvement over use of limited keys or buttons and small text only displays.

In order to accommodate memory requirements, a compact flash socket 422 is connected to the CPU module 400 to allow for memory expansion.

The communication from the system controller 126 to an I/O controller 124, includes configuration information such as input types, output types, input/output mapping, schedules and normal group addressing information. The system controller 126 receives status information on remote operated devices 110 from the I/O controllers 124. The system controller 126 sends on and off commands to the I/O controllers 124 using group addresses in EIB. The I/O controllers 124 send input change notices to the system controller 126 when any input changes state and reports back to the system controller 126, on request, all or part of received information, for verification.

The system controller 126 functions as the configurator and master to all of the panels 100. Apart from configuration, it also tests, diagnoses, and reports device activities for each of up to eight panels 100. The system controller software runs on a window CE operating system.

Figure 6:
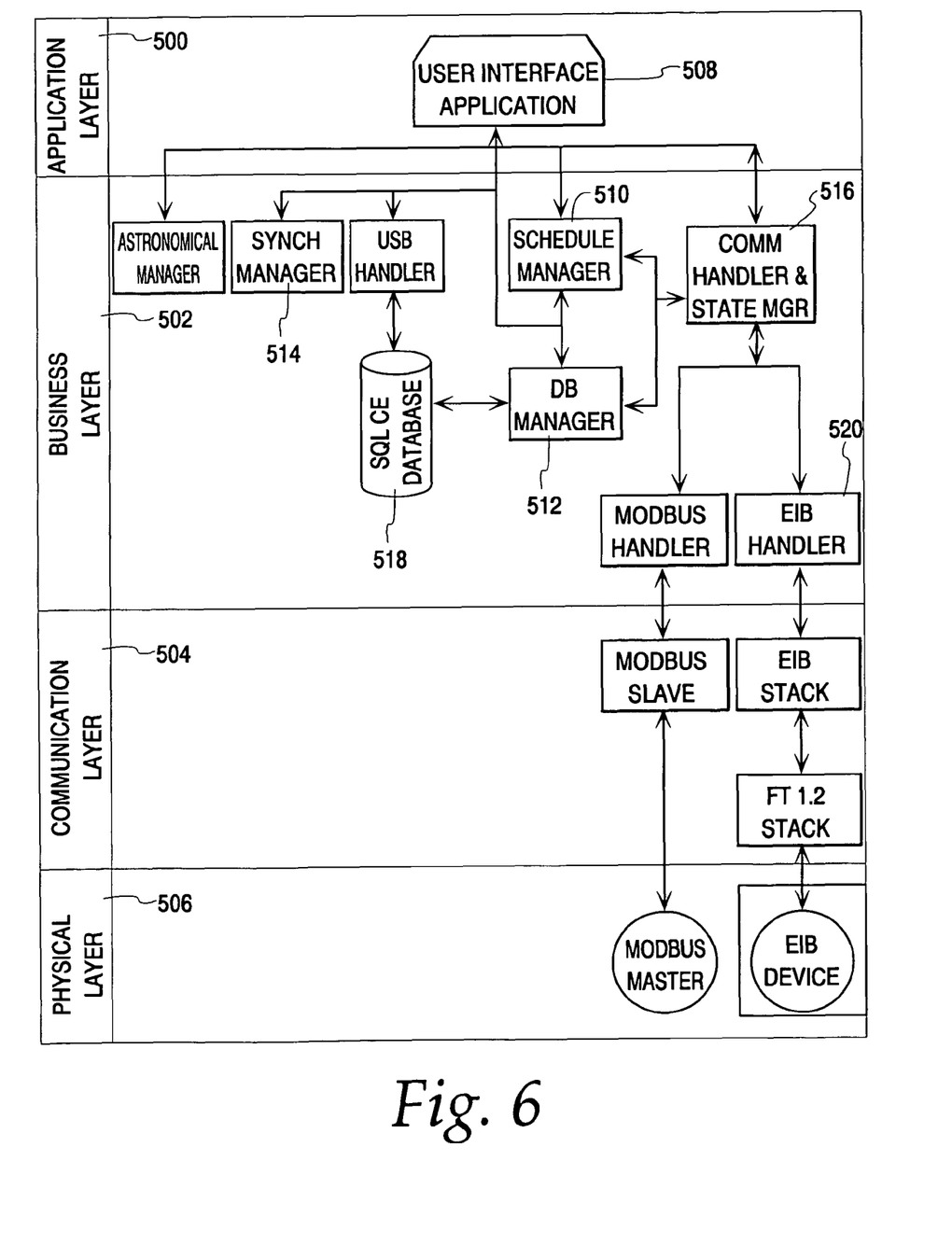
FIG. 6 is a block diagram illustrating architecture of the system controller software.

Referring to FIG. 6, a block diagram illustrates architecture of the system controller software. The software includes an application layer 500, a business layer 502, a communication layer 504 and a physical layer 506.

The application layer 500 includes a user interface application 508 which is a Windows forms application which makes calls to all the business objects on an on-demand basis. This application uses the touch panel interface 154 to drive the application. The business layer 502 includes a schedule manager 510, a database (DB) manager 512, a synchronization manager 514 and a communication handler 516. Other include programs are not described in detail herein.

The schedule manager 510 runs all the time and initiates necessary events when the time to trigger reaches. This object handles all events and treats them based on whether they are scheduled events or manual events. The DB manager 512 is the central object that talks to a database 518, where as the rest of the objects in the system talk to the DB manager 510. The synchronization manager 514 is a time sync object that runs all the time and synchronizes the clocks with all of the panels 100 and the system controller 126. A communications handler 516 accepts all requests from the user interface application 508 or from other business objects, such as the schedule manager 510, and dispatches these requests to the appropriate protocol handler.

An EIB handler 520 performs the functions of taking requests from the communication handler 516 and sending them out to the EIB network 170, see FIG. 5, and responding to any EIB messages received from the EIB network 170.

Figure 7:
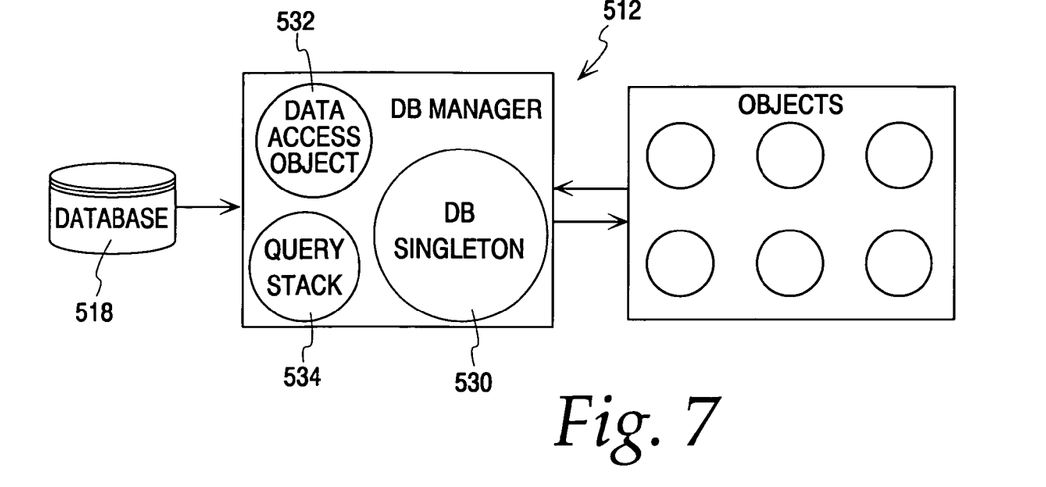
FIG. 7 is a block diagram illustrating a data abstraction layer in the database manager of FIG. 6.

Referring to FIG. 7, The DB manager 512 provides a database abstraction layer through its three major components—DB Singleton 530, Data Access Objects 532 and Query Stack 534. The DB Singleton 530 provides a single instance of the database connection to coordinate any sort of request to the database 518. The Data Access Objects 532 has an underlying Data Access Generic Functions to retrieve, update or delete data for the action specific to the calling object. The DB Manager 512 uses the Query Stack 534 to cache the frequently used database queries for quick retrieval.

Figure 8:
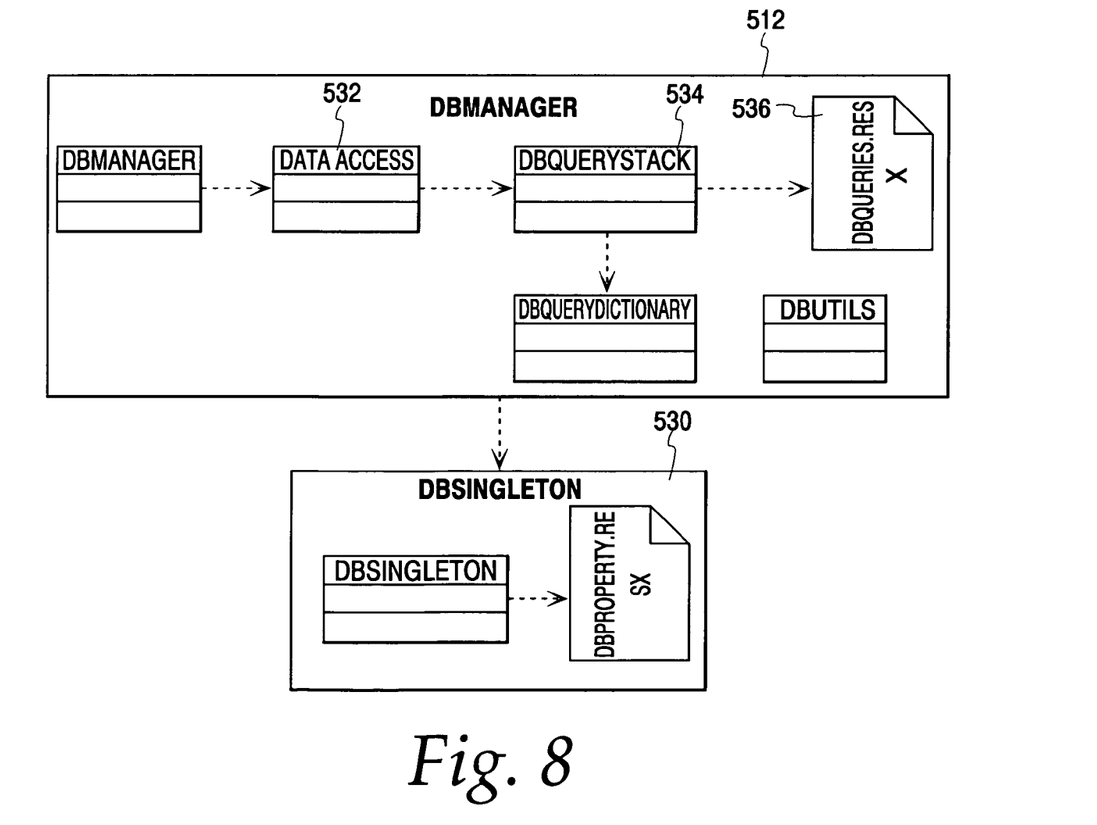
FIG. 8 is a block diagram of the database manager of FIG. 6.

Referring to FIG. 8, singleton is the term used for a single instance of an object. The purpose of the DB Singleton 530 is to control access to the database connection resource since SQL CE has a restriction of allowing only one active connection at a time. In order to eliminate the overhead in creating and closing the database connections, the DB Singleton 530 makes sure that only one database connection is in use at a time.

SQL CE is a subset of a regular SQL Server. It is limited in features and small in size to be compatible for smart device applications. One of the limitation is it does not support stored procedures. A stored procedure is a precompiled program that resides native to the database. Using stored procedures increases performance over using regular queries. To overcome this limitation, this Query Stack object is designed with caching to increase the performance. The Query Stack 534 uses caching to store the most actively used database queries. This increases performance by always keeping the most recent queries in cache 536. The maximum number of queries cached is configurable. The most recently accessed query is put in the foremost position in the stack. If the query that is requested is already in the stack it is put forward in the stack, otherwise the query is added to the stack. If the stack has already reached its maximum limit the least accessed query is forced out of the stack in order to accommodate the new query.

The data access object 532 defines the generic routines to access or modify data in the database 518. This data access object 532 is morphed to take care of the database oriented actions of the system. For example, to retrieve the location list from the database from the user interface 508, the DB manager 512 defines a function to retrieve the data with the query from the Query Stack 534 through the generic function defined by the data access object 532.

Figure 9:
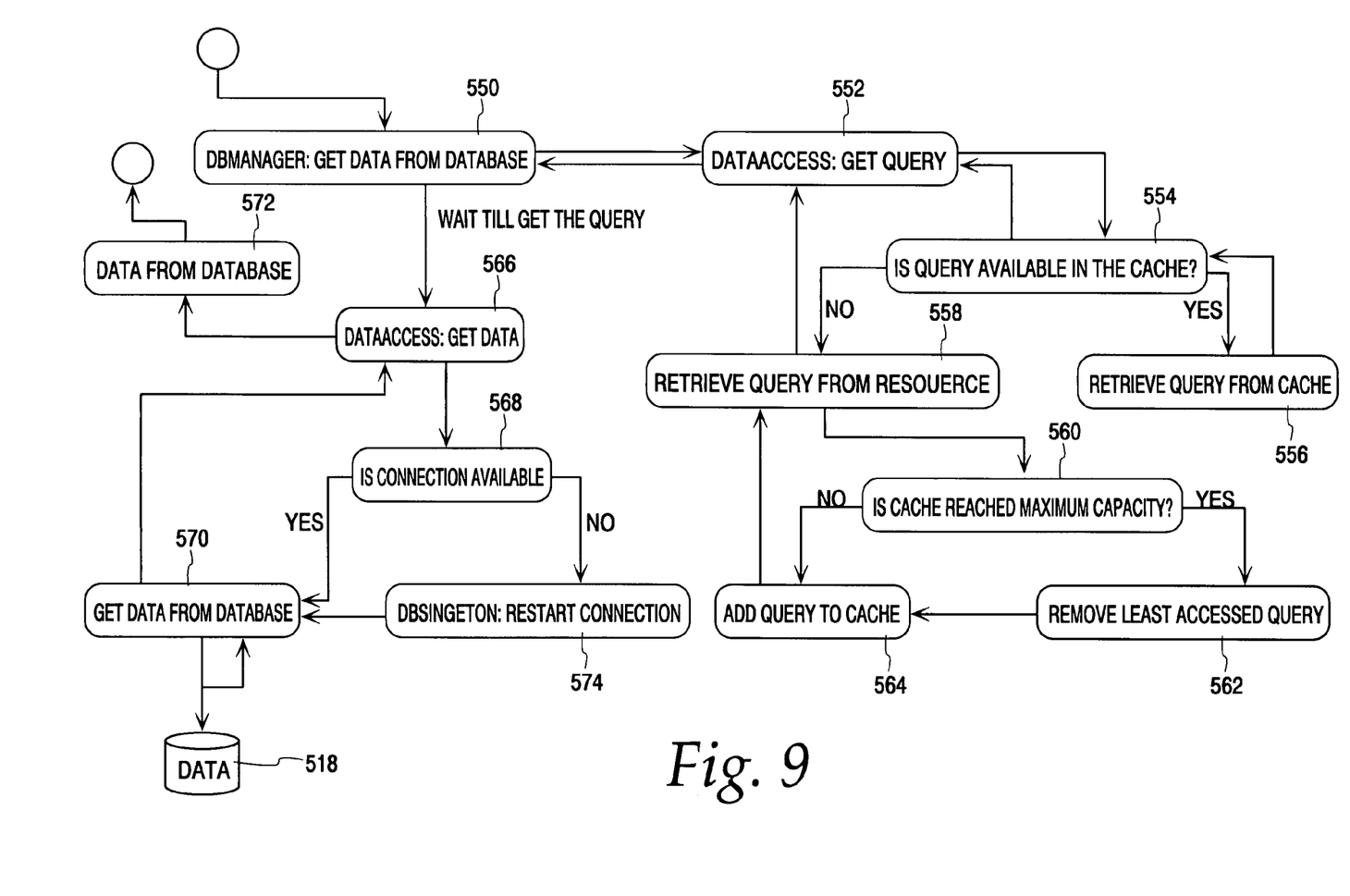
FIG. 9 is a state diagram for the database manager of FIG. 6.

FIG. 9 illustrates the state diagram for the DB manager 512. A request for data from the database 518 is received at a block 550. The data access object initiates a get query operation at a block 552. A block 554 determines if the query is available in the cache 536. If so, then the query is retrieved from cache 536 at a block 556 and returned to the block 552 and thus the block 550. If not, then the query is retrieved from the appropriate resource at a block 558. A block 560 determines if the cache 536 is at maximum capacity. If so, then the least accessed query is removed from the cache 536 at a block 562. Thereafter, or if the cache 536 is not at maximum capacity, then the query is added to the cache 536 at a block 564 and the software returns to the block 558. The returned query is returned to the block 552 and thus the block 550.

The get data function at the block 550 waits until the query is returned and then instructs the data access object to get the requested data using the returned query at a block 566. A block 568 determines if a connection to the DB singleton 530 is available. If so, then data is retrieved from the database 518 at a block 570 and returned to the block 566. The data is then provided to the requesting resource at a block 572. If the DB singleton connection is not available, then a block 574 restarts the connection and then proceeds to the block 570 to retrieve the data from the database 518, as above.

Thus, in accordance with the invention, an electrical power distribution system, such as a lighting control system, includes a system controller including a database manager providing a database abstraction layer with query stack and caching.

The present invention has been described with respect to flowcharts and block diagrams. It will be understood that each block of the flowchart and block diagrams can be implemented by computer program instructions. These program instructions may be provided to a processor to produce a machine, such that the instructions which execute on the processor create means for implementing the functions specified in the blocks. The computer program instructions may be executed by a processor to cause a series of operational steps to be performed by the processor to produce a computer implemented process such that the instructions which execute on the processor provide steps for implementing the functions specified in the blocks. Accordingly, the illustrations support combinations of means for performing a specified function and combinations of steps for performing the specified functions. It will also be understood that each block and combination of blocks can be implemented by special purpose hardware-based systems which perform the specified functions or steps, or combinations of special purpose hardware and computer instructions.

We claim:

1. A method of requesting access to data in an electrical distribution system, comprising:
   providing a panel comprising a plurality of remote operated devices mounted in the panel, each remote operated device for connection in a branch circuit to a load device;
   providing a panel controller operatively connected to each of the remote operated devices, the panel controller comprising a programmed controller for controlling operation of the remote operated devices;
   providing a database associated with the programmed controller storing configuration data relating to operation of the remote operated devices; and
   operating a database manager for accessing data in the database responsive to requests of the programmed controller, comprising storing a cache of data queries and responsive to a received request for data operating a get query routine and a get data routine, the get query routine comprising determining if a query relating to the received request is stored in the cache and if the query is stored in the cache then returning the stored query, or if the query is not stored in the cache then retrieving the query from a resource and returning the retrieved query, and the get data routine comprising operating the returned query against the database to access data in the database for use by the programmed controller.

2. The method of claim 1 wherein operating the get query routine further comprises storing the retrieved query in the cache.

3. The method of claim 2 further comprising removing a least accessed query form the cache.

4. The method of claim 1 wherein operating the database manager further comprises providing a single resource to access data in the database and wherein operating the returned query to access data in the database comprises establishing a connection with the single resource.

5. The method of claim 4 wherein the single resource allows only a single database connection at a time.

6. A method of requesting access to data in an electrical distribution system including a panel comprising a plurality of remote operated devices mounted in the panel, each remote operated device for connection in a branch circuit to a load device, and a panel controller operatively connected to each of the remote operated devices, the panel controller comprising a programmed controller for controlling operation of the remote operated devices, the method comprising:
   providing a database associated with the programmed controller storing configuration data relating to operation of the remote operated devices;
   providing a cache of database queries;
   receiving a request for accessing data in the database;
   operating a get query routine comprising determining if a query relating to the received request is stored in the cache and if the query is stored in the cache then returning the stored query, or if the query is not stored in the cache then retrieving the query from a resource and returning the retrieved query; and
   operating a get data routine comprising operating the returned query against the database to access data in the database for use by the programmed controller.

7. The method of claim 6 further comprising storing the retrieved query in the cache.

8. The method of claim 7 further comprising removing a least accessed query form the cache.

9. The method of claim 6 further comprising providing a single resource to access data in the database and wherein operating the returned query to access data in the database comprises establishing a connection with the single resource.

10. The method of claim 9 wherein the single resource allows only a single database connection at a time.

11. An electrical distribution system including a database manager using a query stack, comprising:
    a panel comprising a plurality of remote operated devices mounted in the panel, each remote operated device for connection in a branch circuit to a load device;
    a panel controller operatively connected to each of the remote operated devices, the panel controller comprising a programmed controller for controlling operation of the remote operated devices;
    a database operatively associated with the programmed controller storing configuration data relating to operation of the remote operated devices;
    wherein the panel controller is programmed to implement a database manager for accessing data in the database responsive to requests of the programmed controller, comprising storing a cache of data queries and responsive to a received request for data operating a get query routine and a get data routine, the get query routine comprising determining if a query relating to the received request is stored in the cache and if the query is stored in the cache then returning the stored query, or if the query is not stored in the cache then retrieving the query from a resource and returning the retrieved query, and the get data routine comprising operating the returned query against the database to access data in the database for use by the programmed controller.

12. The electrical distribution system of claim 11 wherein the get query routine further comprises storing the retrieved query in the cache.

13. The electrical distribution system of claim 12 wherein the database manager further comprises removing a least accessed query form the cache.

14. The electrical distribution system of claim 11 wherein the database manager further comprises providing a single resource to access data in the database and wherein operating the returned query to access data in the database comprises establishing a connection with the single resource.

15. The electrical distribution system of claim 14 wherein the single resource allows only a single database connection at a time.

* * * * *